(12) United States Patent
Ripberger et al.

(10) Patent No.: US 6,983,355 B2
(45) Date of Patent: Jan. 3, 2006

(54) VIRTUALIZATION OF PHYSICAL STORAGE USING SIZE OPTIMIZED HIERARCHICAL TABLES

(75) Inventors: Richard Anthony Ripberger, Tucson, AZ (US); Michael P. Vageline, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 10/457,579

(22) Filed: Jun. 9, 2003

(65) Prior Publication Data

US 2004/0250043 A1    Dec. 9, 2004

(51) Int. Cl.
*G06F 12/00*    (2006.01)

(52) U.S. Cl. .................................... 711/206; 711/209
(58) Field of Classification Search ..............................
711/202–203, 205–209, 114
See application file for complete search history.

(56) References Cited

U.S. PATENT DOCUMENTS

| 4,758,946 | A | 7/1988 | Shar et al. ................... 364/200 |
| 5,890,189 | A | 3/1999 | Nozue et al. ................ 711/100 |
| 6,088,780 | A | 7/2000 | Yamada et al. ............. 711/206 |
| 6,144,970 | A | 11/2000 | Bonner et al. ............... 707/206 |
| 6,151,660 | A | 11/2000 | Aoki ........................... 711/129 |
| 6,212,614 | B1 | 4/2001 | Hoerig et al. ................ 711/209 |
| 6,216,214 | B1 | 4/2001 | Bryg et al. ................... 711/207 |
| 6,345,368 | B1 | 2/2002 | Bergsten ....................... 714/11 |
| 6,393,544 | B1 | 5/2002 | Bryg et al. ................... 711/220 |
| 6,396,838 | B1 | 5/2002 | Palnati .................... 370/395.31 |
| 2002/0026558 | A1 | 2/2002 | Reuter et al. ................ 711/114 |
| 2002/0029326 | A1 | 3/2002 | Reuter et al. ................ 711/206 |
| 2002/0065792 | A1 | 5/2002 | Bonner et al. .................. 707/1 |

*Primary Examiner*—Nasser Moazzami
(74) *Attorney, Agent, or Firm*—Swanson & Bratschun, LLC

(57) ABSTRACT

Disclosed are a method and system for a storage controller to manage the allocation of emulated storage devices to physical storage segments. The space within the emulated devices is identified by a logical address. The storage controller is in communication with at least one host device and at least one physical storage device. A plurality of tables, each having entry spaces to store segment identification or segment table and entry identification, is established in the storage controller. The tables define a tree structure by which a segment to be accessed is identified by mapping a logical address through the tables to a segment identification. The number of tables, the number of pages in each table, and the number of entries in each page are selected to optimize the amount of space in the storage controller required by the tables and to ensure that the segments may be allocated in any proportion among the emulated storage devices, including all of the segments being allocated to a single emulated device. Moreover, the allocation of segments to emulated storage space is dynamic by changing the contents of the tables.

22 Claims, 6 Drawing Sheets

VIRTUALIZATION OF PHYSICAL STORAGE USING SIZE OPTIMIZED HIERARCHICAL TABLES

TECHNICAL FIELD

The present invention relates generally to the field of computer storage subsystems and, in particular, to efficiently and dynamically allocating physical storage among emulated storage devices.

BACKGROUND ART

In a typical large-scale data processing system, physical storage devices (which may include individual storage disk units, RAID ("redundant array of independent disks") arrays, or a combination) are attached through a controller. One or more host systems are also attached to the controller and may read from and write to attached storage. Physical storage may be "virtualized" whereby a host sends a command to access data on a "logical" volume on a virtual or "emulated" storage device and the controller maps the virtual address into the address of the physical storage space in which the desired data resides. Such an arrangement isolates the hosts from the storage devices, allowing an emulated device to include storage space in more than one physical device. An advantage of virtual storage architecture is that a variety of different types of storage devices may be used and may be physically separated from each other and from the hosts. Moreover, physical storage may be added, removed, relocated or otherwise reorganized by merely updating the address map. Emulated devices may be reorganized in the same manner. Due to command translations and address mapping in the controller, the physical storage is hidden from the hosts which only "see" emulated devices.

One method of virtualizing storage includes mapping each logical volume to a physical volume on a one-to-one basis. More flexible is a method in which the physical devices are divided into "segments" which are then allocated among the emulated devices. Under the latter method, several segments may be concatenated and assigned to a single emulated device. Tables maintain lists of identifiers of the segments assigned to each device. For example, assume a storage subsystem with D=32 K emulated devices and having physical storage space divided into S=1 M segments. For maximum flexibility, the controller should be able to allocate all of segments to a single emulated device and should also be able to allocate the segments among all of the emulated devices, in equal portions or otherwise. In order to meet the first qualification, each of D tables would require entry spaces and the total number of entries would be S*D=32G. If each segment ID is four bytes (which is S=1M=$2^{30}$ rounded to the next highest whole byte) the space required by all of the tables would total 128 GB. If all of the segments were allocated to a single emulated device, only one of the 32K tables would have any entries (it would be full) and the remaining 32K−1 tables would be empty. Thus, 128 GB−4M, or 99.997%, of table storage space in the controller would be empty.

It will be appreciated that such a technique is extremely inefficient. Consequently, there remains a need for storage subsystem in which emulated device tables are defined in such a manner as to minimize the controller space required to store the tables while maintaining the flexibility to allocate the segments among any or all of the devices in any desired fashion, including allocating all segments to a single device.

SUMMARY OF THE INVENTION

The present invention provides a method and system for a storage controller to manage the allocation of physical storage segments to emulated devices. The space within the emulated devices is identified by a logical address. The storage controller is in communication with at least one host system and at least one physical storage device. A plurality of tables, each having entry spaces to store segment identification or segment table and entry identification, is established in the storage controller. The tables define a tree structure by which a segment to be accessed is identified by mapping a logical address through the tables to a segment identification. The number of tables, the number of pages in each table, and the number of entries in each page are selected to optimize the amount of space in the storage controller required by the tables and to ensure that the segments may be allocated in any proportion among the emulated storage devices, including all of the segments being allocated to a single emulated device. Moreover, the allocation of segments to emulated storage space is dynamic by changing the contents of the tables.

DETAILED DESCRIPTION OF THE PREFERRED EMBODIMENT

Figure 1:
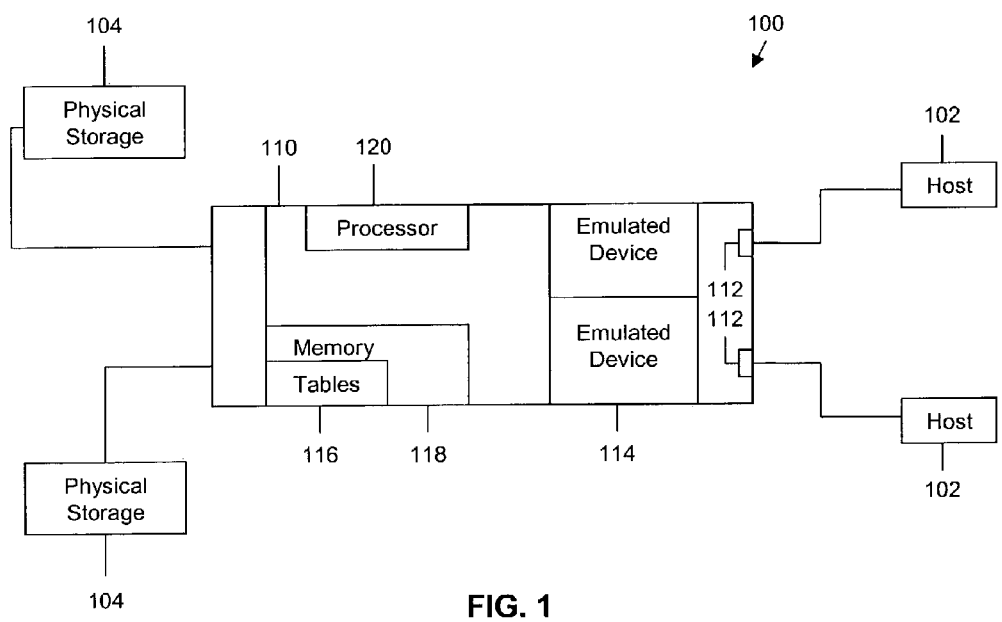
FIG. 1 is a block diagram of a data processing system in which the present invention may be implemented.

FIG. 1 is a block diagram of a data processing system 100 in which the present invention may be implemented. The system 100 includes one or more host systems 102 and one or more physical storage devices 104, all attached to a storage controller 110. The physical storage devices 104 may include individual disk units, RAID array units, or a combination. The physical storage devices 104 may also include compatible devices, disparate devices, or a combination. The controller 110 includes one or more host interfaces 112, to which the hosts 102 are attached, and software which defines one or more emulated devices, identified collectively in FIG. 1 by reference numeral 114. Segment tables 116, stored in a memory 118 (which may be within the controller 110 or elsewhere), define the emulated devices and contain the address mapping necessary for a host 102 to access desired data on a physical device 104. A processing unit 120 is operable to execute instructions (which may be stored in the memory 118 or elsewhere) to map the emulated storage devices 114 to the physical storage devices 104.

Figure 2:
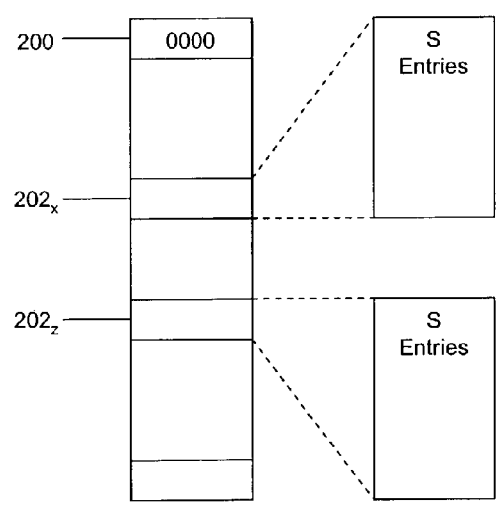
FIG. 2 is a schematic diagram of a prior art segment table structure.

As previously noted, one method by which physical storage space may be mapped to virtual or emulated storage space includes a one-to-one address mapping. FIG. 2 is a schematic diagram of a segment table structure in which one-to-one mapping is employed. An emulated device table 200, stored in memory of the controller, is divided into a plurality of sub-tables $202_0$–$202_{D-1}$, such as sub-tables $202_X$ and $202_Z$. The device table 200 includes one sub-table 202 for each of D emulated devices. Each sub-table includes enough space to store S entries in the event any single emulated device is allocated all S of the physical device segments. However, as also previously noted, the method illustrated in FIG. 1 is inefficient in that much of the memory space used by the table 200 may be wasted at any one time, particularly if a single emulated device is allocated all S of the physical device segments.

Figure 3:
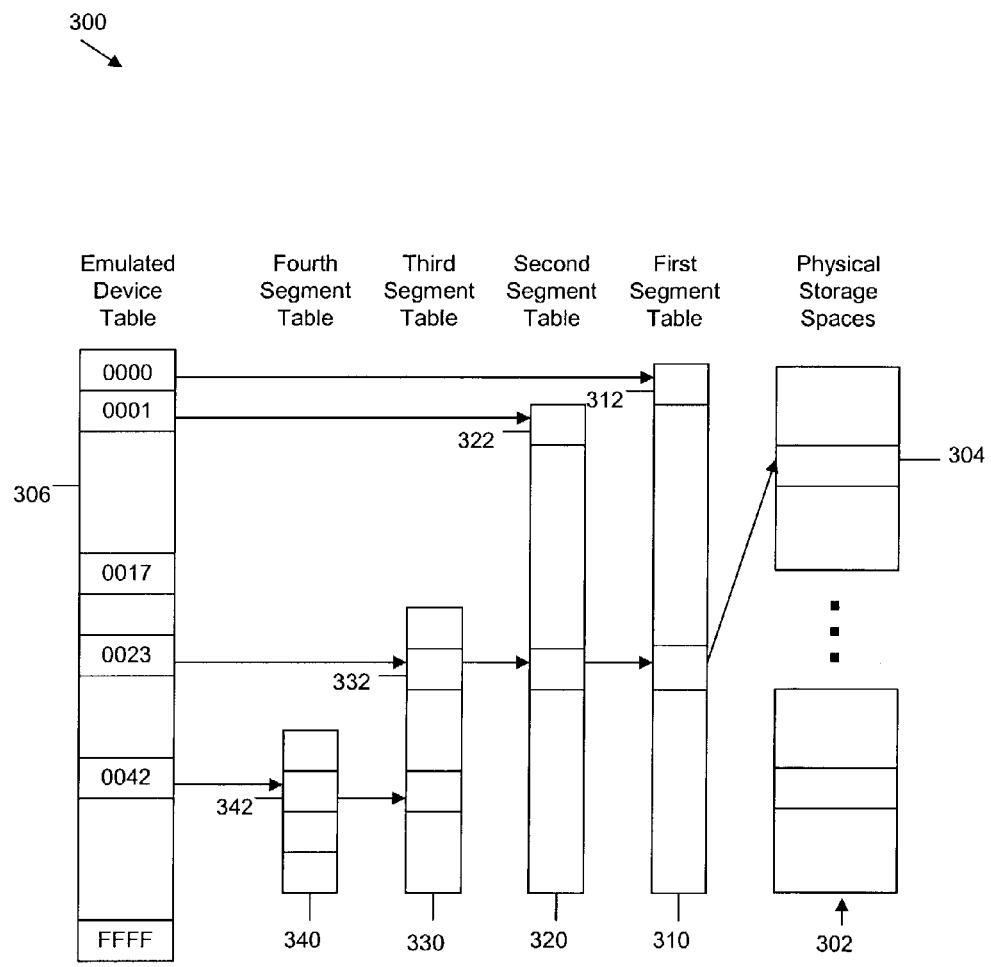
FIG. 3 is a schematic diagram of a multi-level segment table structure of the present invention.

By contrast, a method of the present invention provides a more efficient storage architecture in which storage segments are dynamically allocated among the emulated devices in such a fashion as to minimize the controller space required to store the segment definition tables while maintaining the flexibility to allocate the segments among any or all of the devices in any desired fashion, including allocating all segments to a single device. FIG. 3 is a schematic illustration of segment table architecture 300 of the present invention. Physical storage space 302 includes N devices which are divided into S segments, such as a segment 304 of physical device $N_1$. Each segment is identified by the ID of the storage space (physical device or array) in which the segment is located and by a segment number within the storage space.

An emulated device table 306 includes D entries, one for each emulated device. As will be understood with reference to details set forth below, each entry points to a segment table and a segment table page within the segment table. The architecture further includes a plurality of segment tables having entries which point to other segment tables or to physical storage segments 302. A first segment table 310 stores segment IDs. The first segment table 310 is divided into D sub-tables or pages, such as page 312; each page has storage space for i=S/D entries. Thus, the first segment table 310 has one entry for each physical segment. If the physical segments are to be equally allocated among all of the emulated devices, each entry in the device table 306, such as entry 0000, points to a page in the first segment table, such as page 312, in a one-to-one mapping relationship. In this single segment table configuration, each emulated device may have up to i=S/D segments.

Additional segment tables may be included in the architecture 300 of the present invention to avoid the limitation imposed by a single segment table. A second segment table 320 stores the IDs of the first segment table pages. Because the second segment table 320 is not allocated to an emulated device until the device would require at least two pages in the first segment table 310, the second segment table is itself divided into S/(2i) pages of j entries each. By way of example, an emulated device 0001 points to a page 322 of the second segment table 320 which itself may point to between 2 and j first table segment pages, resulting in a capacity to allocate between i+1 and i*j segments to any single emulated device.

A third segment table 330 may be used to move beyond the i*j segment barrier of two segment tables. Because the third segment table 330 is not allocated to an emulated device until the device would require at least i*j+1 segments, the third segment table is itself divided into S/(i*j) pages of k entries each. By way of example, an emulated device 0023 points to a page 332 of the third segment table 330 and, through pointers in the second and first segment tables, may have a capacity to be allocated between i*j+1 and i*j*k segments of the physical storage 302.

Similarly, a fourth segment table 340 may be used to move beyond the i*j*k segment barrier of three segment tables. Because the fourth segment table 340 is not allocated to an emulated device until the device would require at least i*j*k+1 segments, the third segment table is itself divided into S/(i*j*k) pages of l entries each. By way of example, an emulated device 0042 points to a page 342 of the fourth segment table 340 and, through pointers in the third, second and first segment tables, may have a capacity to be allocated between i*j*k+1 and i*j*k*l segments of the physical storage 302. Additional segment tables may be employed to achieve even greater emulated device capacity but will not be discussed herein.

The size of the segment identifier is dependent upon the number of attached physical devices and the number of segments in each. Put another way, the segment identifier size determines the maximum number of segments S which are available for allocation to emulated devices and should be chosen such that it is always possible to assign a unique-identifier to every physical segment in the storage facility. For example, 16 physical devices can be identified with a 4-bit number ($16=2^4$). If each device has no more than 64 K segments, each segment may be identified with a 16-bit number ($64\ K=2^{16}$). Thus, uniqueness of segment identifiers can be accomplished with 20 bits.

In order to fully take advantage of the hierarchical table "tree" configuration, the present invention provides for the determination of an optimum number of segment tables and the optimum size of the pages in each table (i.e., the number of entries in each page). Because the controller software traverses the table tree each time an I/O operation is executed, the resulting processing speed overhead is proportional to the number of segment table levels. On the other hand, an I/O operation may typically occur on the order of thousands of instruction cycles. Thus, the sensitivity to the number of table levels is less than it would be if I/O operations were more frequent and it may be desireable to increase the number of table levels in exchange for reduced memory required in the controller to store the tables.

Some assumptions or boundaries may be made to assist the optimization process. However, the assumptions stated herein are not meant to limit the present invention and it will be understood that other assumptions, or none at all, may be used. For purposes of the description herein, the assumptions are:

a) The size of each page table will be limited to an integral multiple of 2. The table identifier may be determined by a specific bit range within an logical block address;

b) The segment size X should be chosen to provide the level of storage allocation granularity desired for the emulated devices;

c) The number of emulated devices D which are to be supported in the storage subsystem is assumed to be known or may be determined within a reasonable range; and d) As long as $S \leq 4G$ and $D \leq 64K$, page IDs are assumed to be two bytes and segment IDS assumed to be four bytes. It will be appreciated that the choice of S and D determines the size of table entries and affects the amount of memory required for the tables, the sizes of which are to be optimized. Different values for S and D result in different table sizes and, therefore, different optimization values. However, the process required to determine the optimum table sizes remains unchanged.

A table may be generated and used to calculate the total memory space M required by the tables and thus select an appropriate number of table levels and table sizes. Table I is such a table and has been generated based upon a hypothetical system in which D=32K and S=1M. In the second column of the table, $i_n$ equals the number of entries in each page of the $n^{th}$ table level, with $\pi i_n = S$. Within the limits imposed by this later equation and the constant size of the pages in the first segment table ($i_1 = S/D = 32$ entries) regardless of level, each $i_n$, n>1, may be selected empirically.

TABLE I

| Levels | $i_n$'s | Device Table Space | 1$^{st}$ Table Space | 2-Nth Table Space | Total Table Space |
|---|---|---|---|---|---|
| 1 | i1 = S = 1M | 2D = 64 KB | 4DS = 128 GB | — | 128 GB |
| 2 | i1 = S/D = 32 | 3D = 96 KB | 4S = 4 MB | 2 × 16K × 32K = 1 GB | 1.0 GB |
|   | i2 = D = 32K |   |   |   |   |
| 3 | i1 = S/D = 32 | 3D = 96 KB | 4S = 4 MB | 2 × 16K × 64 + | 6.6 MB |
|   | i2 = 64 |   |   | 2 × 512 × 512 = |   |
|   | i3 = 512 |   |   | 2.5 MB |   |
| 4 | i1 = S/D = 32 | 3D = 96 KB | 4S = 4 MB | 2 × 16K*8 + | 4.59 MB |
|   | i2 = 8 |   |   | 2 × 4K*16 + |   |
|   | i3 = 16 |   |   | 2 × 256 × 256 = |   |
|   | i4 = 256 |   |   | 512 KB |   |
| 5 | i1 = S/D = 32 | 3D = 96 KB | 4S = 4 MB | 2 × 16K × 4 + | 4.37 MB |
|   | i2 = 4 |   |   | 2 × 8K × 4 + |   |
|   | i3 = 4 |   |   | 2 × 2K × 16 + |   |
|   | i4 = 16 |   |   | 2 × 128 × 128 = |   |
|   | i5 = 128 |   |   | 288 KB |   |
| 6 | i1 = S/D = 32 | 3D = 96 KB | 4S = 4 MB | 2 × 16K × 2 + | 4.28 MB |
|   | i2 = 2 |   |   | 2 × 8K + 4 + |   |
|   | i3 = 4 |   |   | 2 × 4K × 4 + |   |
|   | i4 = 4 |   |   | 2 × 1K × 16 + |   |
|   | i5 = 16 |   |   | 2 × 64 × 64 = |   |
|   | i6 = 64 |   |   | 200 KB |   |
| 7 | i1 = S/D = 32 | 3D = 96 KB | 4S = 4 MB | 2 × 16K × 2 + | 4.25 MB |
|   | i2 = 2 |   |   | 2 × 8K × 2 + |   |
|   | i3 = 2 |   |   | 2 × 4K × 4 + |   |
|   | i4 = 4 |   |   | 2 × 2K × 4 + |   |
|   | i5 = 4 |   |   | 2 × 512 × 8 + |   |
|   | i6 = 8 |   |   | 2 × 64 × 64 = |   |
|   | i7 = 64 |   |   | 160 KB |   |
| 8 | i1 = S/D = 32 | 3D = 96 KB | 4S = 4 MB | 2 × 16K × 2 + | 4.23 MB |
|   | i2 = 2 |   |   | 2 × 8K × 2 + |   |
|   | i3 = 2 |   |   | 2 × 4K × 2 + |   |
|   | i4 = 2 |   |   | 2 × 2K × 4 + |   |
|   | i5 = 4 |   |   | 2 × 1K × 4 + |   |
|   | i6 = 4 |   |   | 2 × 256 × 8 + |   |
|   | i7 = 8 |   |   | 2 × 32 × 32 = |   |
|   | i8 = 32 |   |   | 142 KB |   |
| 9 | i1 = S/D = 32 | 3D = 96 KB | 4S = 4 MB | 2 × 16K × 2 + | 4.22 MB |
|   | i2 = 2 |   |   | 2 × 8K × 2 + |   |
|   | i3 = 2 |   |   | 2 × 4K × 2 + |   |
|   | i4 = 2 |   |   | 2 × 2K × 2 + |   |
|   | i5 = 2 |   |   | 2 × 1K × 2 + |   |
|   | i6 = 2 |   |   | 2 × 512 × 4 + |   |
|   | i7 = 4 |   |   | 2 × 256 × 8 + |   |
|   | i8 = 8 |   |   | 2 × 32 × 32 = |   |
|   | i9 = 32 |   |   | 134 KB |   |
| 10 | i1 = S/D = 32 | 3D = 96 KB | 4S = 4 MB | 2 × 16K × 2 + | 4.22 MB |
|   | i2 = 2 |   |   | 2 × 8K × 2 + |   |
|   | i3 = 2 |   |   | 2 × 4K × 2 + |   |
|   | i4 = 2 |   |   | 2 × 2K × 2 + |   |
|   | i5 = 2 |   |   | 2 × 1K × 2 + |   |
|   | i6 = 2 |   |   | 2 × 512 × 2 + |   |
|   | i7 = 2 |   |   | 2 × 256 × 4 + |   |
|   | i8 = 4 |   |   | 2 × 128 × 8 + |   |
|   | i9 = 8 |   |   | 2 × 16 × 16 = |   |
|   | i10 = 16 |   |   | 130.5 KB |   |
| 11 | i1 = S/D = 32 | 3D = 96 KB | 4S = 4 MB | 2 × 16K × 2 + | 4.22 MB |
|   | i2 = 2 |   |   | 2 × 8K × 2 + |   |
|   | i3 = 2 |   |   | 2 × 4K × 2 + |   |
|   | i4 = 2 |   |   | 2 × 2K × 2 + |   |
|   | i5 = 2 |   |   | 2 × 1K × 2 + |   |
|   | i6 = 2 |   |   | 2 × 512 × 5 + |   |
|   | i7 = 2 |   |   | 2 × 256 × 2 + |   |
|   | i8 = 2 |   |   | 2 × 128 × 2 + |   |
|   | i9 = 2 |   |   | 2 × 64 × 8 + |   |
|   | i10 = 8 |   |   | 2 × 16 × 16 = |   |
|   | i11 = 16 |   |   | 129 KB |   |

TABLE I-continued

| Levels | $i_n$'s | Device Table Space | $1^{st}$ Table Space | 2-Nth Table Space | Total Table Space |
|---|---|---|---|---|---|
| 12 | i1 = S/D = 32 | 3D = 96 KB | 4S = 4 MB | 2 × 16K × 2 + | 4.22 MB |
|  | i2 = 2 |  |  | 2 × 8K × 2 + |  |
|  | i3 = 2 |  |  | 2 × 4K × 2 + |  |
|  | i4 = 2 |  |  | 2 × 2K × 2 + |  |
|  | i5 = 2 |  |  | 2 × 1K × 2 + |  |
|  | i6 = 2 |  |  | 2 × 512 × 2 + |  |
|  | i7 = 2 |  |  | 2 × 256 × 2 + |  |
|  | i8 = 2 |  |  | 2 × 128 × 2 + |  |
|  | i9 = 2 |  |  | 2 × 64 × 8 + |  |
|  | i10 = 4 |  |  | 2 × 32 × 4 + |  |
|  | i11 = 4 |  |  | 2 × 8 × 4 = |  |
|  | i12 = 8 |  |  | 128.38 KB |  |
| 13 | i1 = S/D = 32 | 3D = 96 KB | 4S = 4 MB | 2 × 16K × 2 + | 4.22 MB |
|  | i2 = 2 |  |  | 2 × 8K × 2 + |  |
|  | i3 = 2 |  |  | 2 × 4K × 2 + |  |
|  | i4 = 2 |  |  | 2 × 2K × 2 + |  |
|  | i5 = 2 |  |  | 2 × 1K × 2 + |  |
|  | i6 = 2 |  |  | 2 × 512 × 2 + |  |
|  | i7 = 2 |  |  | 2 × 256 × 2 + |  |
|  | i8 = 2 |  |  | 2 × 128 × 2 + |  |
|  | i9 = 2 |  |  | 2 × 64 × 2 + |  |
|  | i10 = 2 |  |  | 2 × 32 × 4 + |  |
|  | i11 = 4 |  |  | 2 × 16 × 4 + |  |
|  | i12 = 4 |  |  | 2 × 4 × 4 = |  |
|  | i13 = 4 |  |  | 128.16 KB |  |
| 14 | i1 = S/D = 32 | 3D = 96 KB | 4S = 4 MB | 2 × 16K × 2 + | 4.22 MB |
|  | i2 = 2 |  |  | 2 × 8K × 2 + |  |
|  | i3 = 2 |  |  | 2 × 4K × 2 + |  |
|  | i4 = 2 |  |  | 2 × 2K × 2 + |  |
|  | i5 = 2 |  |  | 2 × 1K × 2 + |  |
|  | i6 = 2 |  |  | 2 × 512 × 2 + |  |
|  | i7 = 2 |  |  | 2 × 256 × 4 + |  |
|  | i8 = 2 |  |  | 2 × 128 × 2 + |  |
|  | i9 = 2 |  |  | 2 × 64 × 2 + |  |
|  | i10 = 2 |  |  | 2 × 32 × 2 + |  |
|  | i11 = 2 |  |  | 3 × 2 + × 3 + |  |
|  | i12 = 2 |  |  | 2 × 8 × 4 + |  |
|  | i13 = 4 |  |  | 2 × 4 × 4 = |  |
|  | i14 = 4 |  |  | 128.03 KB |  |
| 15 | i1 = S/D = 32 | 3D = 96 KB | 4S = 4 MB | 2 × 16K × 2 + | 4.22 MB |
|  | i2 = 2 |  |  | 2 × 8K × 2 + |  |
|  | i3 = 2 |  |  | 2 × 4K × 2 + |  |
|  | i4 = 2 |  |  | 2 × 2K × 2 + |  |
|  | i5 = 2 |  |  | 2 × 1K × 2 + |  |
|  | i6 = 2 |  |  | 2 × 512 × 5 + |  |
|  | i7 = 2 |  |  | 2 × 256 × 2 + |  |
|  | i8 = 2 |  |  | 2 × 128 × 2 + |  |
|  | i9 = 2 |  |  | 2 × 64 × × 2 + |  |
|  | i10 = 2 |  |  | 2 × 32 × 2 + |  |
|  | i11 = 2 |  |  | 2 × 16 × 2 + |  |
|  | i12 = 2 |  |  | 2 × 8 × 2 + |  |
|  | i13 = 2 |  |  | 2 × 4 × 2 + |  |
|  | i14 = 2 |  |  | 2 × 2 × 4 = |  |
|  | i15 = 4 |  |  | 128 KB |  |
| 16 | i1 = S/D = 32 | 3D = 96 KB | 4S = 4 MB | 2 × 16K × 2 + | 4.22 MB |
|  | i2 = 2 |  |  | 2 × 8K × 2 + |  |
|  | i3 = 2 |  |  | 2 × 4K × 2 + |  |
|  | i4 = 2 |  |  | 2 × 2K × 2 + |  |
|  | i5 = 2 |  |  | 2 × 1K × 2 + |  |
|  | i6 = 2 |  |  | 2 × 512 × 5 + |  |
|  | i7 = 2 |  |  | 2 × 256 × 2 + |  |
|  | i8 = 2 |  |  | 2 × 128 × 2 + |  |
|  | i9 = 2 |  |  | 2 × 64 × × 2 + |  |
|  | i10 = 2 |  |  | 2 × 32 × 2 + |  |
|  | i11 = 2 |  |  | 2 × 16 × 2 + |  |
|  | i12 = 2 |  |  | 2 × 8 × 2 + |  |
|  | i13 = 2 |  |  | 2 × 4 × 2 + |  |
|  | i14 = 2 |  |  | 2 × 2 × 2 = |  |
|  | i15 = 2 |  |  | 127.99 KB |  |
|  | i16 = 2 |  |  |  |  |
| 4 - Example | i1 = S/D = 32 | 3D = 96 KB | 4S = 4 MB | 2 × 16K × 32 + | 5.15 MB |
|  | i2 = 32 |  |  | 2 × 1K × 32 + |  |
|  | i3 = 32 |  |  | 2 × 32 × 32 = |  |
|  | i4 = 32 |  |  | 1.06 MB |  |

In the third column, the amount of space required for the emulated device table is constant (above the use of just a single table). In the case of a single table level, the device table is not even required because the device number (D) can be used as the index to a subtable within the single table level. For any case with multiple table levels, each entry in the device table contains three bytes—one byte (2 bits in this example) to select which table level and two bytes to identify a subtable within the specified table. For D=32K, the device table is 3D bytes or 96K. Similarly in the fourth column, 4 bytes are the amount of space required for each of the S entries in the first segment table; thus, 4 MB are required to store all of the segment IDs in the first segment table. With respect to the fifth column, in each of the remaining segment tables, 2 bytes are required for each pointer entry; this is multiplied by the number of pages in the segment table and by the number of entries in each page.

Table I includes information for subsystems with up to 16 segment table levels and for a subsystem having 4 segment tables with 32 entries in each page of each table. Given that $\pi i_n = S$ and given that the size of the pages in the first segment table is constant ($i_1 = S/D = 32$ entries), each $i_n$, $n>1$, may be selected to minimize the total table space. If desired, a computer may be programmed to calculate the numerous permutations and determine a minimum table size for each level. As is evident by Table I, the optimum table sizes are not necessarily achieved by allocating the same number of entries per page to all tables. For example, when a comparison is made of the last entry in Table I (where four table levels each have 32 entries 32 entries per page) to the prior entry in the table for four levels, 5.12 MBs vs. 4.59 MBs represents an 11% reduction in required table space.

Figure 4:
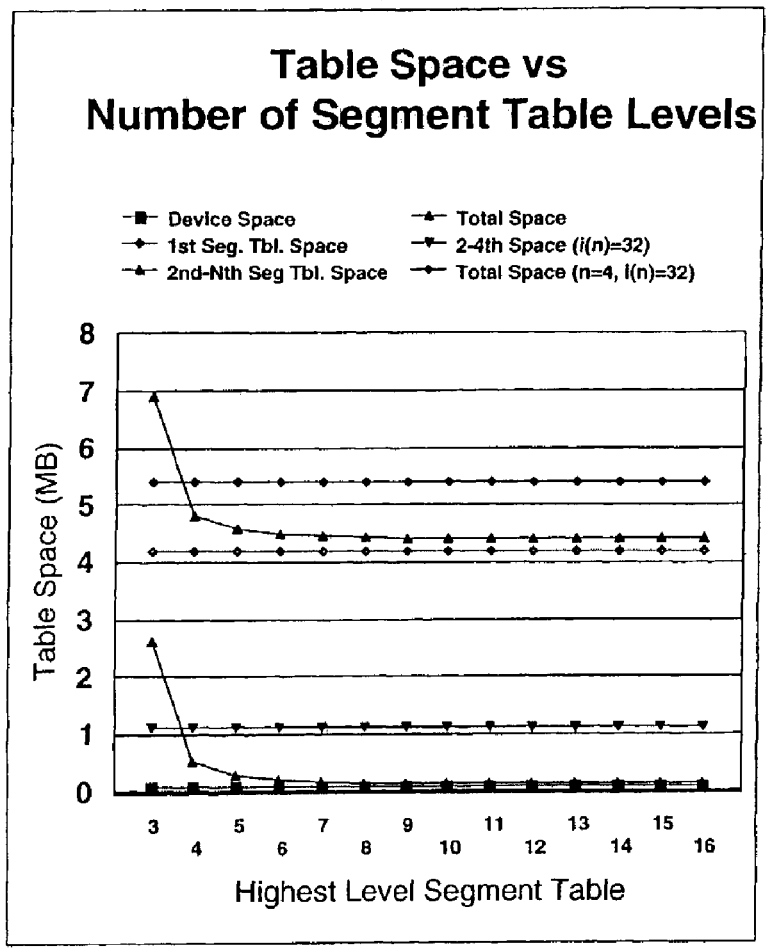
FIG. 4 is a plot of the total table space required at various segment table levels.

The total table size M (sixth column) decreases as the number of segment table levels increases. However, because the number M in the sixth column of Table I has been rounded for convenience, an examination of the fifth column will highlight the decrease. It is very apparent that a significant amount of space may be saved when moving from a single table (128 GB) to two tables (1.0 GB) to three (6.6 MB) to four (4.59 MB), a reduction of about 99.9996%. FIG. 4 graphically illustrates the reduction in table space M versus segment table level. (Data points for the first two table levels has been omitted due to the resulting difficulty in scaling the plot.) However, as also illustrated in FIG. 4, the rate at which table size decreases itself decreases as the number of table levels increases, showing only nominal reductions beyond about ninth level (n=9), particularly relative to the fixed amount of space allocated to the first segment table. Consequently, a decision to limit the number of table levels to, for example, 9 might be an appropriate tradeoff between controller memory space and I/O operation speed as discussed above. That is, the savings of space above about nine levels may not be worth the associated extra operating overhead. It will be appreciated that different systems having different parameters will result in different tradeoffs.

It has been found that the most memory efficient configuration may be for each page in each segment table beyond the first to have two entries and include as many table levels as necessary to provide the desired emulated space (referring again to the $\pi i_n = S$ boundary). In such a configuration, $L = \log_2(D)$, where L is the number of table levels beyond the first. This results in the minimum number of unused pointers in the tree when an emulated device does not align perfectly with the tree structure but also results in the maximum number of table levels. For example, if D=32K, then L=$\log_2$(32K)=15 and fifteen tables beyond the first, having two entries in each, appears to provide the most memory efficient configuration.

Figure 5:
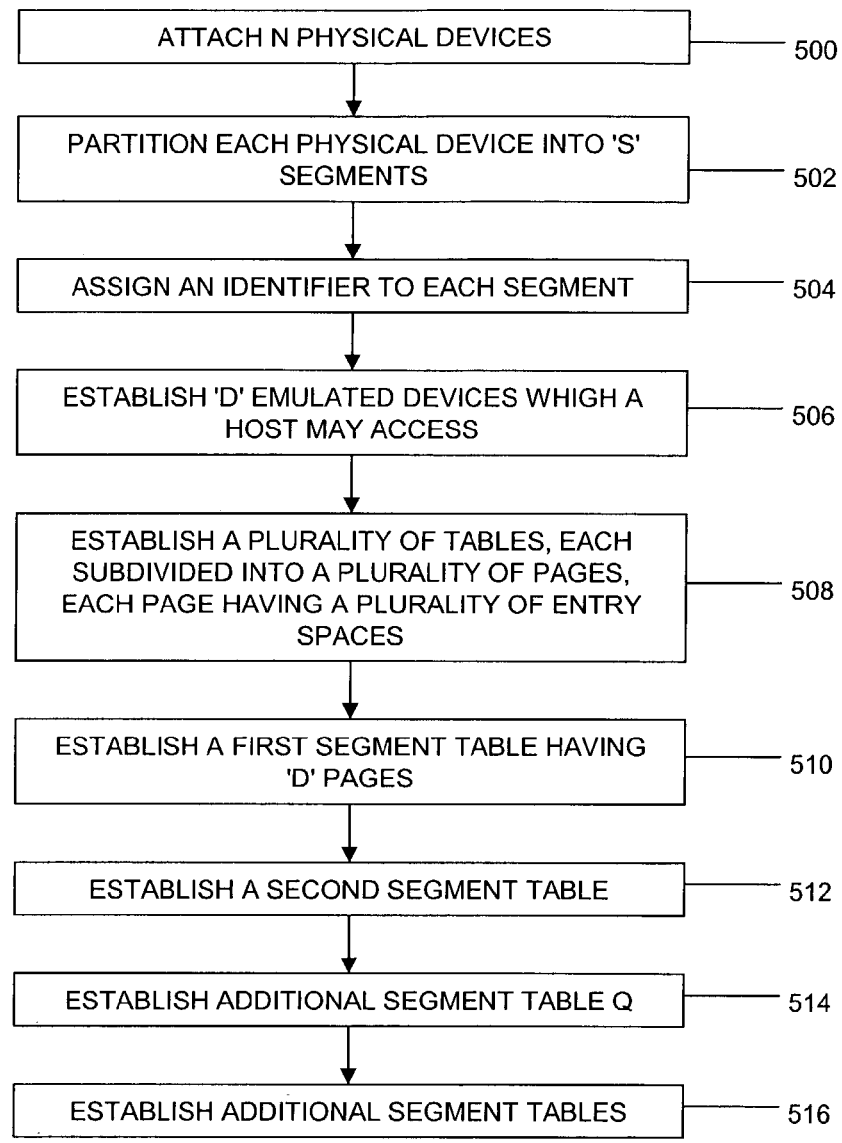
FIG. 5 is a flow chart of one aspect of the present invention.

The flow chart in FIG. 5 summarizes the method of configuring a storage subsystem of the present invention. N physical devices are attached to the subsystem (step 500) and are partitioned into S equal-size segments (step 502). An identifier is assigned to each segment (step 504) having a first portion identifying the physical device in which the segment is located and a second portion identifying the location of the segment within the physical device. D emulated devices are established (step 506) to be accessible by attached host devices.

A number n of segment tables are established within the storage controller memory (step 508). Each table is subdivided into a number of sub-tables or pages;
each page holds a number of entry spaces for storing pointers. As described above, the number of segment tables and the number of entries in each are chosen so that the physical segments may be allocated among all of the emulated devices in any proportion, including all to any single emulated device.

A first of the segment tables is established (step 510) with D pages, each page having $i_1 S/D$ entry spaces. Each entry space in the first segment table stores a segment number for pointing to the segment. A second of the segment tables may be established (step 512) with S/(2i) pages, each page having $i_2 = S/i$ entry spaces. Each entry space in the second segment table stores a first table (page and entry) identifier for pointing to an entry in the first segment table.

A $Q^{th}$ table may be established with S/($\pi i$) pages, where i equals the number of pages in any preceding page (that is, i ranges from 1 to Q-1) (step 514). Each entry space in the $Q^{th}$ segment table has $i_Q$ entry spaces, where $\pi i_k = S$ for k=1 to n and n is the total number of segment tables in the configuration. Each entry space in the $Q^{th}$ table stores an identifier for pointing to an entry in the preceding $(Q-1)^{th}$ segment table. Additional segment tables are established as desired (step 516).

An emulated device table is established storing an identifier for each of the D emulated devices (step 516). Each identifier has a first portion identifying a segment table and a second portion identifying a page within the segment table.

Figure 6:
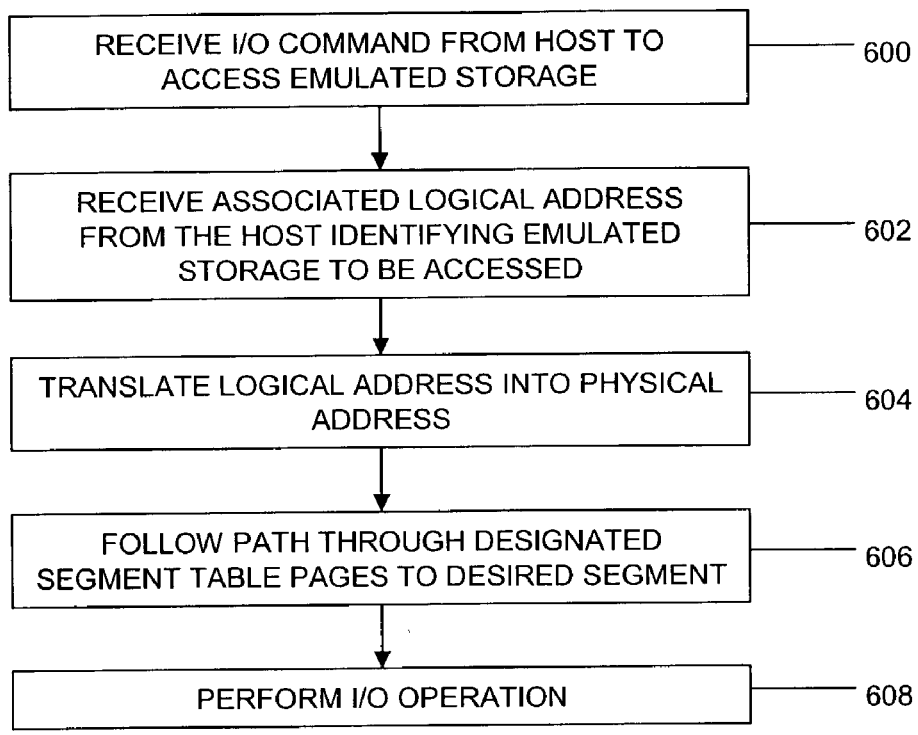
FIG. 6 is a flow chart of another aspect of the present invention.

FIG. 6 is a flow chart summarizing the operation of a storage subsystem of the present invention. After the subsystem has been configured, an I/O command is received by the controller from an attached host to access (read from or write to) data on an emulated device (step 600). Included with the I/O command is a logical block address (LBA) of the block of data to be accessed (step 602). The LBA points to an emulated logical block where the host "sees" the desired data, even though the data physically is stored in segments of one or more physical devices.

The controller translates or maps the LBA into the ID of the segment(s) where the data physically is stored (step 604). For example, assume again that D=32K emulated devices have been designated and that physical storage of up to 16 physical devices has been divided into S=1M segments of X=1 GB each, with logical blocks of B=512 bytes. Assume further that four segment tables have been established in the controller. The first segment table has D=32K pages with $i_1 = S/D = 32$ entries each. The second segment table has been selected to have $S/2i_1 = 16K$ pages, also with $i_2 = 32$ entries each. The third segment table has been selected to have $S/2i_1 i_2 = 1K$ pages, also with $i_3 = 32$ entries each. Finally, the fourth segment table has been selected to have $S/2i_1 i_2 i_3 = 32$ pages, also with $i_4 = 32$ entries each.

Figure 7:
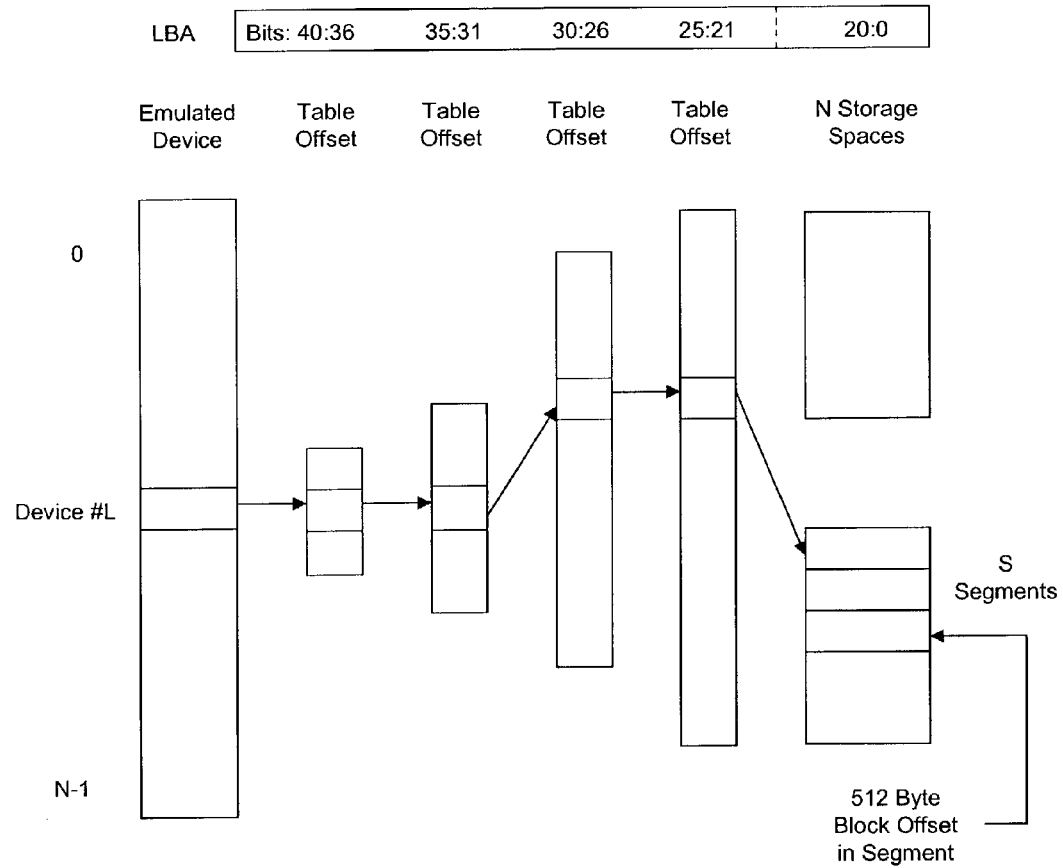
FIG. 7 is a schematic diagram illustrating the nature of a logical block address and its relation to segment offsets.

As illustrated by FIG. 7, The LBA may be divided into ranges of bits, with the last range specifying the block offset within the selected segment, and each prior range specifying the offset into the selected subtable of a segment table. In the present example, an LBA is divided into five parts: one for the segment offset and one for each of the four segment tables. Because the pages in each of the four segment tables in the example contain the same number of entries (32), the number of bits of the LBA allocated to each table is $\log_2(32)=\log_2(32)=5$. Moreover, the number of bits required to find the logical block in the segment is $\log_2$(segment size/logical block size), or $\log_2(X/B)=\log_2(1 \text{ GB}/512)=\log_2(2^{21})=21$ bits. Thus, The selected emulated device provides the index into the device table in FIG. 3 that identifies a sub-table in one of the segment tables.

LBA Bits 36:40 provide an offset into a subtable of the fourth segment table (if such a subtable is identified by the device table; otherwise these bits must be zeroes). The pointer at this offset in the subtable identifies a third segment table subtable.

LBA Bits 31:35 provide an offset into a subtable of the third segment table (if such a subtable is identified by the device table or the prior segment table; otherwise, these bits must be zeroes). The pointer at this offset in the subtable identifies a second segment table subtable.

LBA Bits 26:30 provide an offset into a subtable of the second segment table (if such a subtable is identified by the device table or the prior segment table; otherwise, these bits must be zeroes). The pointer at this offset in the subtable identifies a first segment table subtable.

LBA Bits 21:25 provide an offset into a subtable of the first segment table (if such a subtable is identified by the device table or the prior segment table; otherwise, these bits must be zeroes). The segment ID at this offset in the subtable identifies segment associated with this access.

LBA Bits 0:20 identify the logical block within the selected 1 GB segment.

By following the path through the segment tables, the appropriate segment is found and the LBA offset in the segment allows the correct logical block to be located (step 606) and the requested I/O operation is performed (step 608).

It should be noted that the present invention is also applicable to CKD devices where the normal access is to a track rather than a block. Several tracks may be stored in each segment. To access a track, the track address is translated into a logical track address with the tracks associated with an emulated device being logical tracks 0 to T. The track address is divided by the number of tracks per segment to obtain the number of corresponding bits 21:40 of the LBA used to access the table structure. The remainder of the division provides the track offset within the segment.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for managing physical storage space in a storage subsystem, the physical storage space including at least one physical storage device attached to a storage controller in communication with at least one host system, the method comprising:
    dividing the physical storage device into a plurality of segments (S);
    assigning an identifier to each segment, the identifier having a first portion identifying a physical device in which the segment is located and a second portion identifying a location within the physical device;
    establishing a plurality of emulated devices (D) within the storage controller for access by the at least one host system;
    establishing a plurality of tables within the storage controller, each table subdivided into a plurality of pages, each page having a plurality of entry spaces, the tables comprising:
        a first segment table having D pages, each page having a first plurality of entry spaces ($i_1$) or storing segment identifiers, each segment identifier having a first plurality of bits identifying a segment number within a physical storage device and a second plurality of bits identifying a physical storage device; and
        a second segment table having a plurality of pages equal to $S/(2i_1)$, each page having a second plurality of entry spaces ($i_2$) for storing pointers to entries in the first segment table; and
        an emulated device table having a plurality of entry spaces equal to D, each entry space for storing an identifier of a segment table and an identifier of a segment table page;
    selecting the number of second entry spaces $i_2$ such that:
        memory space required by the segment tables in the storage controller is optimized; and
        the segments may be allocated among any of the emulated devices in any proportion, including allocating all of the segments to a single emulated device;
    during operation of the storage subsystem, dynamically allocating the segments to the emulated devices; and
    during operation of the storage subsystem, using the device and logical address provided through a host I/O operation to access a logical block of an emulated device on the physical storage device associated with the emulated device by:
        using a provided device address to select an entry in the emulated device table;
        using information in the emulated device table entry to find a highest segment table and a segment table page within the highest segment table associated with the emulated device;
        using a logical block address (LBA) to navigate through the segment tables by considering the LBA as:
            a first plurality of bits identifying an entry within a second segment table page that contains a pointer to a first segment table page;
            a second plurality of bits identifying an entry within the first segment table page which contains the segment identifier; and
            a third plurality of bits identifying a logical block within the physical segment identified by the segment identifier;
    whereby a logical address on the emulated device is mappable to a logical block on a segment within the physical storage space.

2. The method of claim 1, wherein establishing a plurality of tables within the storage controller further comprises:
establishing a third segment table having a plurality of pages equal to $S/(i_1 * i_2)$, each page having a third plurality of storage spaces ($i_3$) for storing a pointer to entries in the second segment table;
whereby the number of segments S equals the product $\pi$ of the number of storage spaces i in each of the k segment tables ($\pi i_k = S$, k=1–3).

3. The method of claim 1, wherein establishing a plurality of tables within the storage controller further comprises:
establishing additional segment tables, including a $Q^{th}$ table, the $Q^{th}$ table having a plurality of pages equal to the number of segments S divided by the product $\pi$ of the number of storage spaces i in each of the k segment tables ($S/\pi i_k$), where k=1 through Q-1, and each page in the $Q^{th}$ table having $i_Q$ storage spaces for storing a pointer to entries in the preceding segment table Q-1.

4. The method of claim 3, wherein the pages of each segment table have an equal number of storage spaces.

5. The method of claim 1, wherein establishing a plurality of tables within the storage controller further comprises:
establishing a third segment table having a plurality of pages equal to $S/(i_1 * i_2)$, each page having a third plurality of storage spaces ($i_3$) for storing a pointer to entries in the second segment table;
establishing a fourth segment table having a plurality of pages equal to $S/(i_1 * i_2 * i_3)$, each page having a fourth plurality of storage spaces ($i_4$) for storing a pointer to entries in the third segment table; and
selecting the number of storage spaces $i_1$, $i_2$, $i_3$, and $i_4$ such that the number of segments S equals the product $\pi$ of the number of storage spaces i in each of the four segment tables ($\pi i_k = S$, k=1–4) and $i_1 = i_2 = i_3 = i_4$.

6. The method of claim 1, further comprising:
receiving a command in the storage controller from the at least one attached host system to access data identified by a logical address on a specified emulated device;
accessing in sequence the segment tables identified by the logical address and emulated device;
accessing in sequence segment table entries identified by the accessed segment tables and the logical address;
accessing a segment identifier in the first segment table to identify a desired segment; and
accessing the desired logical block within the desired segment and executing the received command.

7. A storage controller system for managing access to physical storage, the storage controller system in communication with a host system, the storage controller system comprising:
a first interface for attaching at least one physical storage system;
means for defining a plurality of segments (S) within the physical storage system;
means for defining a plurality of emulated storage devices (D) emulating physical storage space in the physical storage system, the emulated storage devices comprising logical storage spaces, each identified by a logical address;
a second interface whereby a command by the host system to access space in an emulated storage device is redirected to allocated storage segments in the attached physical storage system;
a first segment table in memory, the first segment table having D pages, each page having a plurality of entry spaces ($i_1 = S/D$) for storing segment identifiers; and
at least one additional segment table in the memory, the additional segment table having a plurality of pages, each page having a plurality of entry spaces for storing pointers to entries in another segment table;
an emulated device table having a number of entry spaces equal to D, each entry space for storing an identifier of a segment table and an identifier of a segment table page;
the number of segment tables, the number of pages in each segment table, and the number of entries in each page of each segment table being selecting such that:
memory space required by the segment tables in the storage controller is optimized; and
the segments may be allocated among any of the emulated devices in any proportion, including allocating all of the segments to a single emulated device;
means for dynamically allocating the segments among the emulated devices; and
means for mapping a logical address on the emulated device to a logical block on a segment within the physical storage space.

8. The system of claim 7, the means for mapping comprising:
means for using a provided device address to select an entry in the emulated device table;
means for using information in the emulated device table entry to find a highest segment table and a segment table page within the highest segment table associated with the emulated device; and
means for using a logical block address (LBA) to navigate through the segment tables by considering the LBA as:
a first plurality of bits identifying an entry within a second segment table page that contains a pointer to a first segment table page;
a second plurality of bits identifying an entry within the first segment table page which contains the segment identifier; and
a third plurality of bits identifying a logical block within the physical segment identified by the segment identifier.

9. The system of claim 8, further comprising:
means for receiving a command in the storage controller from the host system to access data identified by a logical address on a specified emulated device;
means for accessing in sequence the segment tables identified by the logical address and emulated device;
means for accessing in sequence segment table entries identified by the accessed segment tables and the logical address;
means for accessing a segment identifier table to identify a desired segment; and
means for accessing the desired logical block within the desired segment and executing the received command.

10. The system of claim 7, the means for dynamically allocating the segments comprising means for changing the contents of the segment tables.

11. The system of claim 7, wherein:
the number of segment tables is four; and
the number of entry spaces $i_1$, $i_2$, $i_3$, and $i_4$ in each segment table are selected such that the number of segments S equals the product $\pi$ of the number of storage spaces i in each of the four segment tables ($\pi i_k = S$, k=1–4) and $i_1 = i_2 = i_3 = i_4$.

12. The system of claim 7, wherein the logical addresses are logical block addresses.

13. The system of claim 7, wherein the logical addresses are logical track addresses.

14. The system of claim 7, wherein the physical storage is a disk device.

15. The system of claim 7, wherein the physical storage is a RAID device.

16. The system of claim 7, further comprising microcode operable to execute a sequence of instructions to access the segment tables.

17. A computer-readable storage medium tangibly embodying a program of instructions executable by a processor in a storage subsystem for managing physical storage space in the storage subsystem, the physical storage space including at least one physical storage device attached to a storage controller in communication with at least one host system, the program comprising instructions for:

dividing the physical storage device into a plurality of segments (S);

assigning an identifier to each segment, the identifier having a first portion identifying a physical device in which the segment is located and a second portion identifying a location within the physical device;

establishing a plurality of emulated devices (D) within the storage controller for access by the at least one host system;

establishing a plurality of tables within the storage controller, each table subdivided into a plurality of pages, each page having a plurality of entry spaces, the tables comprising:

a first segment table having D pages, each page having a first plurality of entry spaces ($i_1$) for storing segment identifiers, each segment identifier having a first plurality of bits identifying a segment number within a physical storage device and a second plurality of bits identifying a physical storage device; and a second segment table having a plurality of pages equal to $S/(2i_1)$, each page having a second plurality of entry spaces ($i_2$) for storing pointers to entries in the first segment table; and an emulated device table having a plurality of entry spaces equal to D, each entry space for storing an identifier of a segment table and an identifier of a segment table page;

selecting the number of entry spaces $i_2$ in the second segment table such that:

memory space required by the segment tables in the storage controller is optimized; and the segments may be allocated among any of the emulated devices in any proportion, including allocating all of the segments to a single emulated device;

during operation of the storage subsystem, dynamically allocating the segments to the emulated devices; and during operation of the storage subsystem, using the device and logical address provided through a host I/O operation to access a logical block of an emulated device on the physical storage device associated with the emulated device by:

using a provided device address to select an entry in the emulated device table;

using information in the emulated device table entry to find a highest segment table and a segment table page within the highest segment table associated with the emulated device;

using a logical block address (LBA) to navigate through the segment tables by considering the LBA as:

a first plurality of bits identifying an entry within a second segment table page that contains a pointer to a first segment table page;

a second plurality of bits identifying an entry within the first segment table page which contains the segment identifier; and a third plurality of bits identifying a logical block within the physical segment identified by the segment identifier;

whereby a logical address on the emulated device is mappable to a logical block on a segment within the physical storage space.

18. The computer-readable storage medium of claim 17, wherein the instructions for establishing a plurality of tables within the storage controller further comprises instructions for:

establishing a third segment table having a plurality of pages equal to $S/(i_1*i_2)$, each page having a third plurality of storage spaces ($i_3$) for storing a pointer to entries in the second segment table;

whereby the number of segments S equals the product $\pi$ of the number of storage spaces i in each of the three segment tables ($\pi i_k = S$, k=1–3).

19. The computer-readable storage medium of claim 17, wherein the instructions for establishing a plurality of tables within the storage controller further comprises instructions for:

establishing additional segment tables, including a $Q^{th}$ table, the $Q^{th}$ table having a plurality of pages equal to the number of segments S divided by the product $\pi$ of the number of storage spaces i in each of the k segment tables ($S/\pi i_k$), where k=1 through (Q-1), and each page in the $Q^{th}$ table having $i_Q$ storage spaces for storing a pointer to entries in the preceding segment table Q-1.

20. The computer-readable storage medium of claim 19, wherein the pages of each segment table have an equal number of storage spaces.

21. The computer-readable storage medium of claim 17, wherein the instructions for establishing a plurality of tables within the storage controller further comprises instructions for:

establishing a third segment table having a plurality of pages equal to $S/(i_1*i_2)$, each page having a third plurality of storage spaces ($i_3$) for storing a pointer to entries in the second segment table;

establishing a fourth segment table having a plurality of pages equal to $S/(i_1*i_2*i_3)$, each page having a fourth plurality of storage spaces ($i_4$) for storing a pointer to entries in the second segment table; and selecting the number of storage spaces $i_1$, $i_2$, $i_3$, and $i_4$ such that the number of segments S equals the product $\pi$ of the number of storage spaces i in each of the four segment tables ($\pi i_{k=S, \ k=}$1–4), and $i_1=i_2=i_3=i_4$.

22. The computer-readable storage medium of claim 17, further comprising instructions for:

receiving a command in the storage controller from the at least one attached host system to access data identified by a logical address on a specified emulated device;

accessing in sequence the segment tables identified by the logical address and emulated device;

accessing in sequence segment table entries identified by the accessed segment tables and the logical address;

accessing a segment identifier in the first segment table to identify a desired segment; and accessing the desired logical block within the desired segment and executing the received command.

* * * * *